(12) United States Patent
Aihara

(10) Patent No.: US 7,115,334 B2
(45) Date of Patent: Oct. 3, 2006

(54) GEL ELECTROLYTE AND FUEL CELL EMPLOYING THE SAME

(75) Inventor: Yuichi Aihara, Yokohama (JP)

(73) Assignee: Samsung SDI Co., Ltd., Suwon-Si (KR)

( * ) Notice: Subject to any disclaimer, the term of this patent is extended or adjusted under 35 U.S.C. 154(b) by 0 days.

(21) Appl. No.: 11/006,651

(22) Filed: Dec. 8, 2004

(65) Prior Publication Data

US 2005/0142411 A1    Jun. 30, 2005

(30) Foreign Application Priority Data

Dec. 8, 2003   (JP) .............................. 2003-408903
Dec. 7, 2004   (KR) ...................... 10-2004-0102207

(51) Int. Cl.
*H01M 8/10*   (2006.01)
*H01M 2/16*   (2006.01)

(52) U.S. Cl. ..................... 429/33; 429/134; 429/247
(58) Field of Classification Search ............... 429/33, 429/247, 134
See application file for complete search history.

(56) References Cited

U.S. PATENT DOCUMENTS 4,505,840 A * 3/1985 Kurkov ...................... 252/500
5,945,233 A * 8/1999 Onorato et al. ............... 429/33

FOREIGN PATENT DOCUMENTS

JP           11-503262      *  3/1999  ................. 429/30

* cited by examiner

*Primary Examiner*—Patrick Joseph Ryan
*Assistant Examiner*—Ben Lewis
(74) *Attorney, Agent, or Firm*—H.C. Park & Associates, PLC

(57) ABSTRACT

The present invention is related to a gel electrolyte composed of a mixture comprising an acid and a high molecular compound. The acid is capable of causing the polymer compound to swell. The polymer compound may comprise a high molecular compound, such as, a partially methylated polybenzimidazole where at least one substituent R group of the polybenzimidazole structure is a methyl group. Additionally, the present invention is related to a fuel cell employing gel electrolyte of the present invention. The gel electrolyte of the present invention has good proton conductivity for a long period of time under conditions having a relative humidity in the range of about 0% to about 50% at an operating temperature in the range of about 100° C. to about 300° C.

6 Claims, 2 Drawing Sheets

GEL ELECTROLYTE AND FUEL CELL EMPLOYING THE SAME

CROSS-REFERENCE TO RELATED APPLICATIONS

This application claims priority to Japanese Patent Application No. 2003-408903, filed on Dec. 8, 2003, in the Japanese Intellectual Property Office, and Korean Patent Application 2004-102207, filed on 7 Dec. 2004, in the Korean Intellectual Property Office, the disclosures of which are incorporated herein in their entirety by reference.

FIELD OF THE INVENTION

The present invention is related to a gel electrolyte and a fuel cell employing the same. In particular, the present invention is related to a gel electrolyte having good proton conductivity even under conditions having a relative humidity in the range of about 0% to about 50% at an operating temperature in the range of about 100° C. to about 300° C.

BACKGROUND

Generally, in order for fuel cells to obtain efficient power generation, system efficiency and long-period endurance of constituting members, an electrolyte membrane having good proton conductivity for an extensive time period at an operating temperature of 100° C. to 300° C. and under conditions having a relative humidity in the range of about 0% to about 50% may be required. An electrolyte member having these features has been considered in the development of conventional solid polymer electrolyte fuel cells. However, in a perfluorocarbonsulfonic acid membrane, sufficient proton conductivity and output power cannot be obtained at an operating temperature of 100° C. to 300° C. and at a relative humidity of less than about 50%.

A solid electrolyte membrane composed of polybenzimidazole doped with a strong acid, such as phosphoric acid has been disclosed in Japanese Patent Publication No. Hei 11-503262. While this type of solid electrolyte membrane has good oxidation resistance and thermal resistance and is operable even at a high temperature of 200° C., the membrane cannot obtain sufficient proton conductivity at a low relative humidity.

SUMMARY OF THE INVENTION

The present invention is directed to a gel electrolyte having good proton conductivity for a long period of time under conditions having a relative humidity in the range of about 0% to about 50% at an operating temperature in the range of about 100° C. to about 300° C. Additionally, the present invention is directed to a fuel cell employing the gel electrolyte of the present invention.

An aspect of the present invention concerns a gel electrolyte composed of a mixture comprising an acid and a polymer compound. The acid may cause swelling of the polymer and may be, for example, phosphoric acid. In particular, the phosphoric acid may include both orthophosphoric acid and condensed phosphoric acid. In a further aspect, the polymer compound may be a partially methylated polybenzimidazole represented by Formula (1) as shown below:

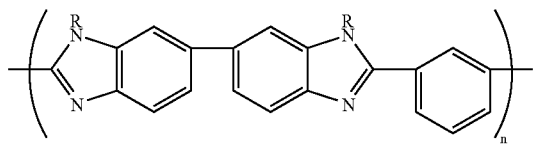

Formula 1

Here, at least one substituent R group of the polybenzimidazole structure may be a methyl group ($CH_3$) or H and n may a number in the range of about 10 to about 100,000. The acid may be, for example, phosphoric acid.

In one aspect, since the partially methylated polybenzimidazole may be used as the polymer compound and the polymer compound may be swollen (gelled) by accepting more acid as the degree of methylation is increased, proton conductivity of the gel electrolyte can be improved when compared to a polybenzimidazole that is not methylated. In a particular aspect, in the gel electrolyte, the partially methylated polybenzimidazole may be a polymethylated benzimidazole with a degree of methylation less than about 80 mol %. Since the degree of methylation may be less than about 80 mol %, the partially methylated polybenzimidazole is not dissolved in an acid.

In a specific ascpect, in the gel electrolyte, the partially methylated polybenzimidazole may be a composed of a mixture comprising poly(N-methylbenzimidazole) with a degree of methylation of about 100 mol % and polybenzimidazole with a degree of methylation of about 0 mol % and where the content of the poly(N-methylbenzimidazole) may be less than about 80 mol %. Since a mixture of polymethylated benzimidazole and polybenzimidazole with a degree of methylation of about 0 mol % may be used as the partially methylated polybenzimidazole, the degree of methylation of the partially methylated polybenzimidazole can be readily changed by altering the composition of the mixture and optimization of properties of the gel electrolyte can be easily achieved.

In a particular aspect, in the gel electrolyte, the partially methylated polybenzimidazole may be composed of a mixture comprising polymethylated benzimidazole with a degree of methylation of about X mol % and polybenzimidazole with a degree of methylation fate of about 0 mol % and when the weight of the polymethylated benzimidazole is A and the weight of the polybenzimidazole is B, f obtained by an equation of $f(\text{mol \%}) = AX/(A+B)$ is less than 80 mol %. Here, X may be greater than about 80 mol % and less than about 100 mol %. Since a mixture of polymethylated benzimidazole a degree of methylation of X mol % and polybenzimidazole with a degree of methylation of the partially methylated polybenzimidazole can be readily changed by altering the composition of the mixture and optimization of properties of the gel electrolyte can be easily achieved.

Another aspect of the present invention is directed to a fuel cell comprising a pair of electrodes and an electrolyte membrane interposed between the electrodes. In particular, a part or the whole of the electrolyte membrane may be composed of any one of the gel electrolytes as described above and the gel electrolyte may be contained in a part of the electrodes. Since the fuel cell may comprise the gel electrolyte with high proton conductivity as an electrolyte membrane and the gel electrolyte may also be included in a part of the electrodes, internal impedance of the fuel cell can be reduced and current density can be increased. In particular, since the gel electrolyte may be contained in a part of the electrodes, protons can readily transported to the inside of the electrodes and internal resistance of the electrodes can be reduced. In a specific aspect, the operating temperature of the fuel cell of the present invention is in the range of about 100° C. to about 300° C.

DETAILED DESCRIPTION OF THE INVENTION

Figure 1:
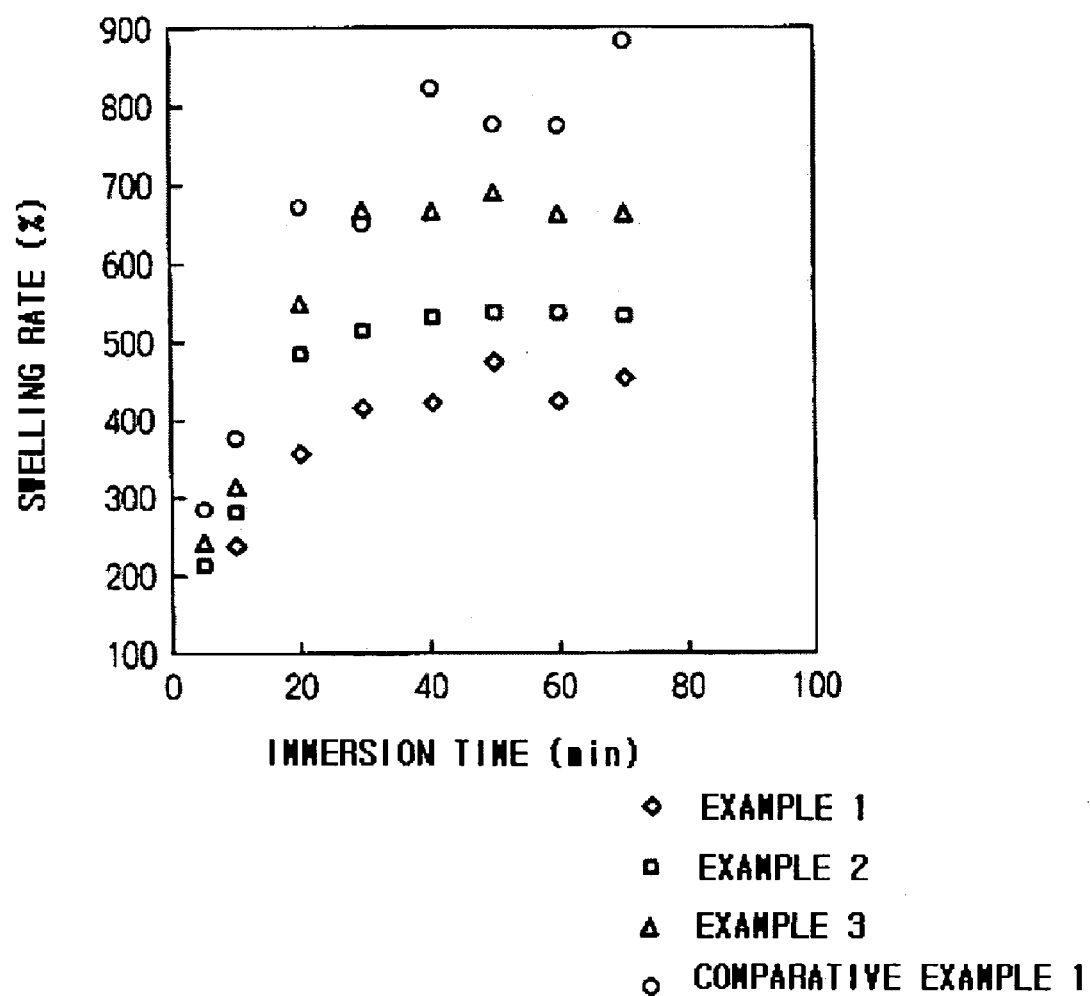
FIG. 1 is a graph illustrating the relationship between the swelling rate of gel electrolytes of Examples 1–3 and Example 5 and the immersion time in phosphoric acid.

An object of the present invention is to provide a fuel cell which comprises a hydrogen electrode, an oxygen electrode, and a gel electrolyte interposed between the hydrogen electrode and the oxygen electrode. Furthermore, the fuel cell of the present invention is capable of operating at a temperature in the range of about 100° C. to about 300° C. Specifically, the gel electrolyte of the present invention has proton conductivity and transports protons (hydrogen ions) generated in the hydrogen electrode to the oxygen electrode. The protons transported by the gel electrolyte may electrochemically react with oxygen ions in the oxygen electrode to produce water and simultaneously generate electric energy.

In an embodiment of the present invention, the hydrogen electrode and the oxygen electrode may also comprise the gel electrolyte. In particular, an electrode material, such as activated carbon, and a binder for solidifying and shaping the electrode material may be included in the hydrogen electrode and the oxygen electrode. Additionally, the binder may comprise the gel electrolyte. Thus, protons may be easily transported between the inside and the outside of the electrode and the internal resistance of the electrode may be reduced.

The gel electrolyte according to an embodiment of the present invention may be composed of a mixture comprising an acid and a polymer compound. In a particular embodiment, the acid may cause the polymer to swell. The acid may be, for example, phosphoric acid and may be comprised of both orthophosphoric acid and condensed phosphoric acid. In a further embodiment, the polymer compound may comprise a partially methylated polybenzimidazole represented by Formula (1) as described above where at least one substituent R group of the polybenzimidazole structure may be a methyl group. In Formula (1), R may be $CH_3$ or H and n may be a number in the range of about 10 to about 100,000. When n is less than 10, the mechanical strength of the gel electrolyte may be reduced. When n is greater than 100,000, the solubility in a solvent may be significantly reduced.

The partially methylated polybenzimidazole may be capable of accepting phosphoric acid. As a degree of methylation is increased, the partially methylated polybenzimidazole may be swollen (gelled) by accepting more phosphoric acid. Thus, the gel electrolyte according to the present embodiment comprises more phosphoric acid, and thus improves proton conductivity.

In particular embodiment of the present invention, the partially methylated polybenzimidazole may be, for example, a polymethylated benzimidazole having a degree of methylation adjusted to be in a range of about 5 mol % to about 80 mol %, and in particular, in the range of about 20 mol % to about 80 mol %; a partially methylated polynenzimidazole composed of a mixture comprising poly (N-methybenzimidazole) with a degree of methyation of about 100 mol % and polybenzimidazole with a methylation degree of of about 0 mol %, where the content of poly(N-methylbenzimidazole) is in the range of about 5 mol % to about 80 mol %, and in particular, in the range of about 20 mol % to about 80 mol %; and a partially methylated polynenzimidazole composed of a mixture comprising polymethylated benzimidazole with a degree of methylation of X mol % and polybenzimidazole with a degree of methylation of 0 mol %, where when the weight of the polymethylated benzimidazole is represented as A, and the weight of the polybenzimidazole is represented as B, f obtained by an equation f(mol %) =AX/(A+B) is in the range of about 5 mol % to about 80 mol %, and in particular, in the range of about 20 mol % to about 80 mol %, provided that X is in the range of about 80 mol % to about 100 mol %.

The methylation rate of the partially methylated polybenzimidazole may be adjusted to be in the range of about 5 mol % to about 80 mol %, and specifically, in the range of about 20 mol % to about 80 mol %. In specific embodiment, the methylation rate may be adjusted by adjusting a degree of reaction for methylation, by adjusting the content of poly (N-methylbenzimidazole), and/or by adjusting the value of f. If the methylation rate of the partially methylated polybenzimidazole is less than about 5 mol %, proton conductivity is reduced due to an insufficient amount of phosphoric acid accepted by the polymer compound. If the methylation rate is about 80 mol % or greater, the partially methylated polybenzimidazole is dissolved due to an excessive amount of phosphoric acid accepted.

Formula (1) as described above, where at least one substituent R of polybenzimidazole structure may be a methyl group and the remaining substituent R may hydrogen may be referred to as "polymethylated benzimidazole". Further, the compound represented by Formula (1) above, where all substituents R groups of polybenzimidazole structure are methyl groups may be referred to as poly(N-methylbenzimidazole). In addition, the compound having Formula (1), where all substituents Rs of polybenzimidazole structure are hydrogen atoms may be referred to as "polybenzimidazole".

As described above, the gel electrolyte of the present invention can improve proton conductivity, and can be used for a fuel cell to increase the current density of the fuel cell and form a fuel cell with high output power.

EXAMPLES

Specific Example 1

Partial Methylation of Polybenzimidazole

A solution containing about 10% by weight of polybenzimidazole in dimethylacetamide was prepared and 30.08 g was added into a schlenk flask. Then, 0.24 g of lithium hydride was slowly added to the flask at room temperature in the presence of argon gas, and refluxed at about 80° C. After cooling to room temperature, the reaction solution was cooled to 0° C. in an ice bath. 1.56 g of methyl iodide was slowly dropped into the reaction solution. Then, the reaction solution was slowly warmed to room temperature while stirring and refluxed at 60° C. The resultant reaction solution was cooled to room temperature, and then eluted with tetrahydrofuran to obtain a powdery solid. The solid was washed with water until the pH was 7, and then dried in vacuum to obtain a partially methylated polybenzimidazole. An analysis using NMR showed the degree of methylation to be about 20 mol %. Preparation of a gel electrolyte.

Preparation of a Gel Electrolyte

A solution having 10% by weight of the resultant partially methylated polybenzimidazole was prepared by dissolving the partially methylated polybenzimidazole in dimethylacetoamide. The solution was coated on a glass plate with a doctor blade. When the surface was opaque, the coating was pre-dried at about 50° C., and then dried again at about 150° C. to form a film. Subsequently, the glass plate was immersed in water and swollen film was peeled. Then, a vacuum drying was performed at 60° C. and 0.1 torr to obtain a polymer membrane. Here, a membrane thickness was about 30 μm.

A gel electrolyte was prepared in the same manner as in Example 1, except that the degree of methylation was adjusted to be about 40 mol % by changing the amount of methyl iodide added.

A gel electrolyte was prepared in the same manner as in Example 1, except that the degree of methylation was adjusted to about 60 mol %.

A dimethylacetoamide solution containing fully methylated poly(N-methylbenzimidazole) in a concentration of 10% by weight and a dimethylacetoamide solution containing non-methylated polybenzimidazole in a concentration of 10% by mass were mixed in a weight ratio of about 1:1. The mixed solution was coated on a glass plate as in Example 1. Then, the resulting coating was dried and immersed in water to obtain a polymer membrane. The resulting polymer membrane was immersed in phosphoric acid as in Example 1, resulting in a gel electrolyte with a degree of methylation of about 50 mol %.

A 10 times diluted solution of the above polymer membrane was thinly coated on a carbon paper (Electrochem), on which a carbon supported Pt was applied and then dried in vacuum to produce an electrode. Two more electrodes were prepared in the same manner and the gel electrolyte prepared as described above, was interposed between the electrodes to produce a fuel cell.

Specific Example 5

A polymer membrane comprising a partially methylated polybenzimidazole was prepared in the same manner as in Example 1, except that the degree of methylation was adjusted to be about 80 mol %. The degree of methylation was adjusted by changing the amount of methyl iodide added.

A gel electrolyte of polybenzimidazole with a degree of methylation of about 0% and a fuel cell were prepared as follows.

For the gel electrolytes of Examples 1–5, the swelling rate may be calculated from the mass (M1) of the polymer membrane before immersing it in phosphoric acid and the mass (M2) of a gel electrolyte after immersing it in phosphoric acid. The swelling rate (% by weight) may be obtained from the following equation: swelling rate (% by weight)=M2/M1×100. The relation between the immersion time in the phosphoric acid and the swelling rate is illustrated in FIG. 1.

The proton conductivity of the gel electrolytes of Examples 1–5 are provided in Table 1. To determine the proton conductivity under a condition close to 0% relative humidity, the gel electrolyte was pierced in a shape of a ring with a diameter of about 13 mm and interposed between Pt blocking electrodes. The resulting cell structure was left at about 70° C. for about 1 hour and a resistance between electrodes was measured according to an AC impedance method.

Referring to FIG. 1, which represents an embodiment of the present invention, the swelling rate of the respective gel electrolytes reached the equivalent state after about 30 minutes. After 70 minutes, the measured equivalent swelling rates were about 450%, about 530% and about 660% for Examples 1–3, respectively. As the degree of methylation was increased, the swelling rate of the gel electrolyte was increased. In contrast, the gel electrolyte of Example 5 comprising a degree of methylation of about 80 mol % was dissolved after immersing it in phosphoric acid for 70 minutes.

Table 1 show that as the degree of methylation was increased in Examples 1–3, proton conductivity was improved. However, in Example 5, since the gel electrolyte was not obtained as a self-supporting membrane as described above, the ionic conductivity could not be measured. Additionally, the swelling rate and the proton conductivity of the gel electrolyte of Example 4 were measured. The equivalent swelling rate after about 70 minutes was about 600% and the proton conductivity at 7 about 0° C. was about 4.00 mS·cm$^{-1}$. In addition, the swelling rate and the porton conductivity of the gel electrolyte of Example 6 were measured. The equivalent swelling rate was about 400% and the proton conductivity at 70° C. was 1.90 mS·cm$^{-1}$

TABLE 1

| | Degree of methylation (mol %) | Proton conductivity (mS · cm$^{-1}$) |
|---|---|---|
| Example 1 | 20 | 2.78 |
| Example 2 | 40 | 2.50 |
| Example 4 | 50 | 4.00 |
| Example 3 | 60 | 5.72 |
| Example 5 | 80 | Not measurable |
| Example 6 | 0 | 1.90 |

Figure 2:
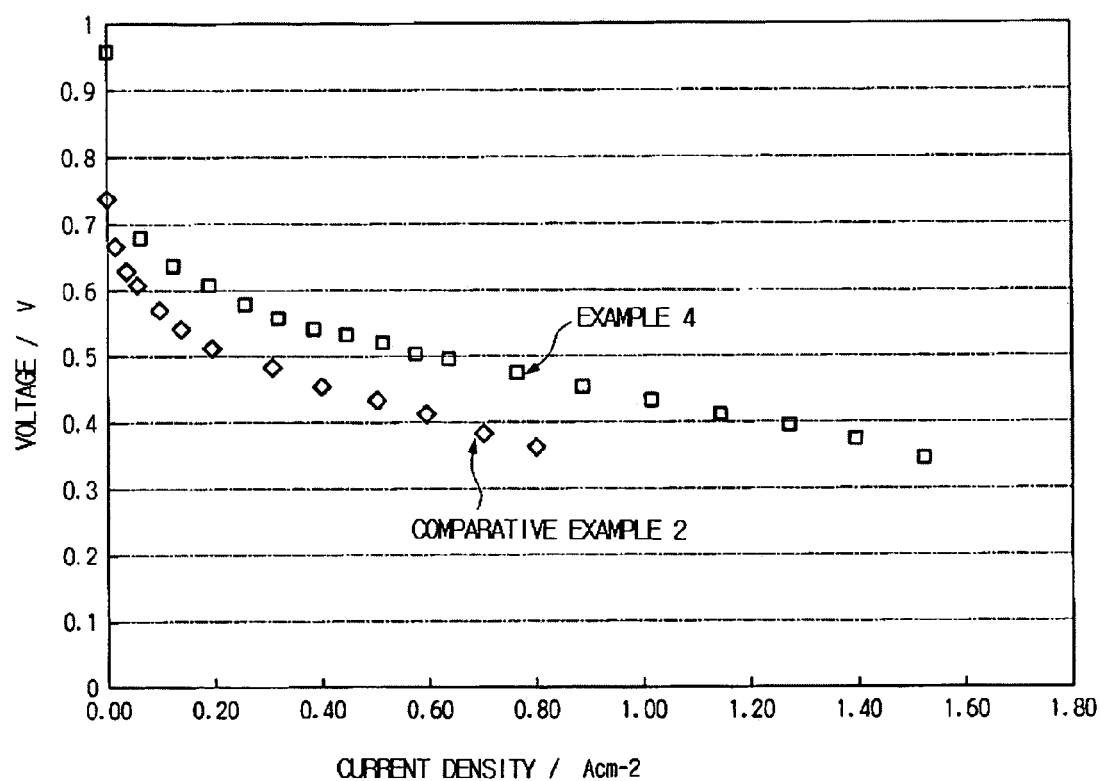
FIG. 2 is a graph illustrating the relationship between the voltage and the current density of fuel cells of Example 4 and Example 6.

For fuel cells of Example 4 and Example 6, a laminate of the electrode and the gel electrolyte was separated by a carbon separator and a test for generation of electric power was performed using hydrogen as an anode gas and oxygen as a cathode gas. The temperature of the cell was about 130° C. and the supply rate of hydrogen and oxygen was about 100 ml/min, respectively. However, specific humidification for the supplied gas was not performed. The electrode area of Example 4 was about 7.84 cm$^2$ and the electrode area of Example 6 was about 10.24 cm$^2$. FIG. 2 illustrates the relationship between the voltage and the current density of the fuel cell.

Referring to FIG. 2, the generation of electric power was possible in Example 4 until the current density was about 1.6 A/cm$^2$. However, the generation of electric power was possible in Example 6 until the current density was about 0.84 A/cm$^2$. Since the fuel cell of Example 4 has low inner resistance due to high proton conductivity of the gel electrolyte, a higher output power may be obtained.

As described above, the gel electrolyte of the present invention can improve proton conductivity, and can be used for a fuel cell to increase a current density of the fuel cell and form a fuel cell with high output power.

What is claimed is:

1. A gel electrolyte comprising:
an acid; and
a polymer compound, wherein the polymer compound is a partially methylated polybenzimidazole represented by Formula (1) where at least one substituent R group of the polybenzimidazole structure is a methyl group:

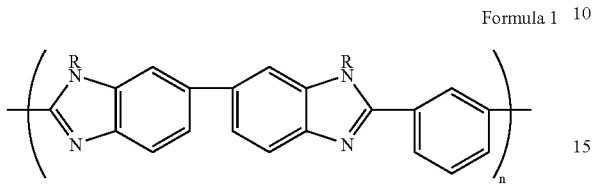

Formula 1 where R is $CH_3$ or H and n is a number in the range of about 10 to about 100,000
wherein the partially methylated polybenzimidazole is a polymethylated benzimidazole with a degree of methylation less than about 80 mol %, and
wherein the partially methylated polybenzimidazole comprises a mixture of poly(N-methylbenzimidazole) with a degree of methylation of about 100 mol % and polybenzimidazole with a degree of methylation of about 0 mol % and a poly(N-methylbenzimidazole) content of less than about 80 mol %.

2. A fuel cell, comprising:
a pair of electrodes; and
an electrolyte membrane interposed between the electrodes, wherein a part or the whole of the electrolyte membrane is a gel electrolyte comprising:
an acid; and
a polymer compound, wherein the polymer compound is a partially methylated polybenzimidazole represented by Formula (1) where at least one substituent R group of the polybenzimidazole structure is a methyl group:

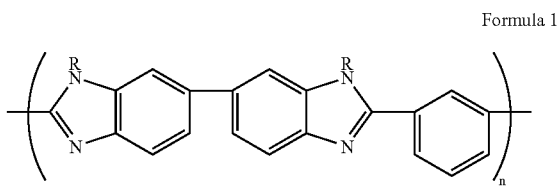

Formula 1 where R is $CH_3$ or H and n is a number in the range of about 10 to about 100,000
wherein the partially methylated polybenzimidazole is a polymethylated benzimidazole with a degree of methylation less than about 80 mol %, and
wherein the partially methylated polybenzimidazole comprises a mixture of poly(N-methylbenzimidazole) with a degree of methylation of about 100 mol % and polybenzimidazole with a degree of methylation of about 0 mol % and a poly(N-methylbenzimidazole) content of less than about 80 mol %.

3. The fuel cell of claim 2, wherein the gel electrolyte is contained in a part of at least one of the electrodes.

4. The fuel cell of claim 2, wherein an operating temperature is in the range of about 100° C. to about 300° C.

5. A gel electrolyte comprising:
an acid; and
a polymer compound, wherein the polymer compound is a partially methylated polybenzimidazole represented by Formula (1) where at least one substituent R group of the polybenzimidazole structure is a methyl group:

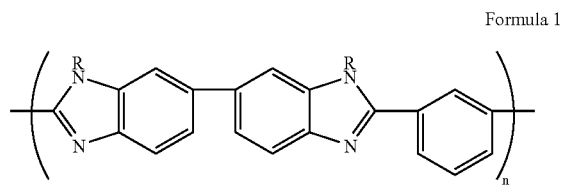

Formula 1 where R is $CH_3$ or H and n is a number in the range of about 10 to about 100,000
wherein the partially methylated polybenzimidazole is a polymethylated benzimidazole with a degree of methylation less than about 80 mol %, and
wherein the partially methylated polybenzimidazole comprises a mixture of polymethylated benzimidazole with a degree of methylation of X mol % and polybenzimidazole with a degree of methylation of about 0 mol % and when the weight of the polymethylated benzimidazole is A and the weight of the polybenzimidazole is B, f obtained by an equation of f(mol %)=AX/(A+B) (where X is in the range of about 80 mol % to about 100 mol %) is less than about 80 mol %.

6. A fuel cell, comprising:
a pair of electrodes; and
an electrolyte membrane interposed between the electrodes, wherein a part or the whole of the electrolyte membrane is a gel electrolyte comprising:
an acid; and
a polymer compound, wherein the polymer compound is a partially methylated polybenzimidazole represented by Formula (1) where at least one substituent R group of the polybenzimidazole structure is a methyl group:

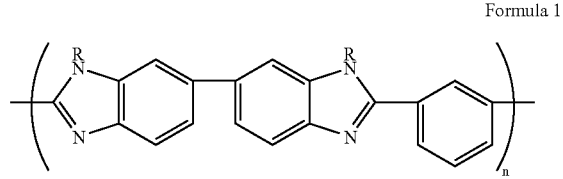

Formula 1 where R is $CH_3$ or H and n is a number in the range of about 10 to about 100,000
wherein the partially methylated polybenzimidazole is a polymethylated benzimidazole with a degree of methylation less than about 80 mol %, and
wherein the partially methylated polybenzimidazole comprises a mixture of polymethylated benzimidazole with a degree of methylation of X mol % and polybenzimidazole with a degree of methylation of about 0 mol % and when the weight of the polymethylated benzimidazole is A and the weight of the polybenzimidazole is B, f obtained by an equation of f(mol %)=AX/(A+B) (where X is in the range of about 80 mol % to about 100 mol %) is less than about 80 mol %.

* * * * *